US007748472B2

(12) United States Patent
Yoshikane

(10) Patent No.: US 7,748,472 B2
(45) Date of Patent: Jul. 6, 2010

(54) HAMMER DRILL

(75) Inventor: Kiyonobu Yoshikane, Anjo (JP)

(73) Assignee: Makita Corporation, Anjo-shi (JP)

( * ) Notice: Subject to any disclaimer, the term of this patent is extended or adjusted under 35 U.S.C. 154(b) by 193 days.

(21) Appl. No.: 12/081,653

(22) Filed: Apr. 18, 2008

(65) Prior Publication Data

US 2008/0271905 A1 Nov. 6, 2008

(30) Foreign Application Priority Data

May 1, 2007 (JP) ............................ 2007-121011

(51) Int. Cl.
*B23B 45/16* (2006.01)

(52) U.S. Cl. .......................... 173/109; 173/90; 173/91; 173/93; 173/102

(58) Field of Classification Search ................ 173/109, 173/90, 91, 93, 102
See application file for complete search history.

(56) References Cited

U.S. PATENT DOCUMENTS

| | | | | | |
|---|---|---|---|---|---|
| 3,685,594 | A | * | 8/1972 | Koehler | 173/48 |
| 3,734,515 | A | * | 5/1973 | Dudek | 279/144 |
| 4,529,044 | A | * | 7/1985 | Klueber et al. | 173/48 |
| 4,567,950 | A | * | 2/1986 | Fushiya et al. | 173/48 |
| 4,991,472 | A | * | 2/1991 | Hollingsworth | 81/464 |
| 5,052,497 | A | * | 10/1991 | Houben et al. | 173/109 |
| RE35,372 | E | * | 11/1996 | Houben et al. | 173/109 |
| 6,192,996 | B1 | | 2/2001 | Sakaguchi et al. | |
| 6,971,455 | B2 | * | 12/2005 | Shibata et al. | 173/48 |
| 7,051,820 | B2 | * | 5/2006 | Stirm | 173/109 |
| 7,073,608 | B2 | * | 7/2006 | Droste | 173/109 |
| 7,377,331 | B2 | * | 5/2008 | Chen | 173/93.5 |
| 2003/0230424 | A1 | * | 12/2003 | Stirm | 173/201 |
| 2007/0102174 | A1 | | 5/2007 | Duesselberg et al. | |

FOREIGN PATENT DOCUMENTS

| | | | |
|---|---|---|---|
| DE | 44 06 841 | C1 | 4/1995 |
| EP | 0 566 926 | A1 | 10/1993 |
| EP | 1 413 778 | A1 | 4/2004 |
| EP | 1 422 028 | A1 | 5/2004 |
| JP | A-2-284881 | | 11/1990 |
| JP | B2 2828657 | | 9/1998 |
| WO | WO 2006/029916 | A1 | 3/2006 |
| WO | WO 2006/045611 | A1 | 5/2006 |
| WO | WO 2007/025805 | A2 | 3/2007 |
| WO | WO 2008/009211 | A1 | 1/2008 |

* cited by examiner

*Primary Examiner*—Brian D Nash
(74) *Attorney, Agent, or Firm*—Oliff & Berridge, PLC

(57) ABSTRACT

A hammer drill has an elastic member without using a coil spring or the like on an intermediate spindle to compact a housing and decrease cost. The elastic member that elastically engages a clutch with a second gear and/or a boss sleeve includes first to third guide spindles, first and second interlock plates, and a coil spring. The guide spindles are provided in parallel with an intermediate spindle. The first and second interlock plates are provided at the first to third guide spindles and slidable integrally with the clutch by engaging with the clutch. The coil spring energizes the first and second interlock plates along the first to third guide spindles.

17 Claims, 15 Drawing Sheets

HAMMER DRILL

BACKGROUND OF THE INVENTION

This application claims the entire benefit of Japanese Patent Application Number 2007-121011 filed on May 1, 2007, the entirety of which is incorporated by reference.

FIELD OF THE INVENTION

The present invention relates to a hammer drill capable of rotating and/or striking a bit at a top end thereof.

DESCRIPTION OF THE BACKGROUND ART

Patent document 1 discloses a hammer drill which includes a spindle (a tool holder) on a front side in a housing, a strike mechanism on a back side in the housing, an intermediate spindle on a lower side of the strike mechanism, a pinion (a rotation transmission member) on a front side on the intermediate spindle, a movement converting member (strike transmission member) on a back side on the intermediate spindle, and a clutch member between the pinion and the movement converting member. The spindle is pivotally supported to hold a bit with a front end thereof. The strike mechanism indirectly strikes the bit through an intermediate element by a reciprocating strike element. The intermediate spindle to which the rotation of a rotary spindle of a motor is transmitted is pivotally supported in parallel with the tool holder. The pinion is engaged with a tool holder side. The movement converting member converts the rotation of the intermediate spindle to a front and back movement, and transmits the movement to the strike mechanism. The clutch member is integrally rotatable with the intermediate spindle and slidable fore and aft. That is, this hammer drill can select a drill mode, a hammer drill mode, and a hammer mode, by sliding and operating the clutch member from an external of the housing so as to engage with and disengage from the pinion and/or the movement converting member. In the drill mode, the clutch member is made to engage with only the pinion so as to give only rotation to the bit. In the hammer drill mode, the clutch member is made to engage with both the pinion and the movement converting member so as to give rotation and strike to the bit. In the hammer mode, the clutch member is made to engage with only the movement converting member so as to give only strike to the bit.

Patent document 1: Japanese patent No. 2828657

SUMMARY OF THE INVENTION

In such a hammer drill, when a clutch member engages with a member on an opposite side, these may not smoothly engage since claws having same phases are interfered each other. To engage these clutch members, an elastic means has been provided to slide the clutch member to elastically engage with the opposite member during sliding. In patent document 1, the clutch member is energized toward the pinion side by a coil spring provided on an intermediate spindle, and thereby the clutch member can rapidly engage with the pinion when being rotated.

However, when such a coil spring is additionally provided on the intermediate spindle, the size of the intermediate spindle in the axial direction becomes long. Thus, the size of the housing increases and cost becomes high.

An objective of the present invention is to provide a hammer drill having elastic means without using a coil spring or the like on the intermediate spindle, keeping smoothly switching an operation mode, and compacting a housing, which decreases cost.

To achieve the above-described objective, a first aspect of the present invention is a hammer drill including:

a housing;

a tool holder which is rotatably and pivotally supported at a front side in the housing, and can mount a bit at a front end thereof;

a strike mechanism which is provided on a back side of the tool holder in the housing and strikes the bit;

a motor arranged on the back side in the housing;

an intermediate spindle which is pivotally supported in parallel with the tool holder in the housing and in which a rotation is transmitted from an output spindle of the motor;

a rotation transmission member which is rotatably provided on the front side of the intermediate spindle as a separated body from the intermediate spindle, and transmits the rotation of the intermediate spindle toward a tool holder side by rotating;

a strike transmission member which is rotatably provided on the back side on the intermediate spindle as a separated body from the intermediate spindle and converts the rotation of the intermediate spindle to a frontward and backward movement by rotating and transmits the movement to the strike mechanism;

a clutch member which is provided between the rotation transmission member and the strike transmission member, and can integrally rotate with the intermediate spindle and slide in a front and back direction;

an operation member to slide the clutch member by an operation from an external of the housing so as to engage the clutch member with and disengage from the rotation transmission member and/or the strike transmission member; and elastic member to elastically engage the clutch member with the rotation transmission member and/or the strike transmission member when the clutch member is slid.

In this hammer drill, the elastic means includes a guide member in parallel with the intermediate spindle, an interlock member which is provided at the guide member and can integrally slide while engaging with the clutch member, and an elastic member to energize the interlock member along the guide member.

A second aspect of the present invention is a hammer drill in the first aspect, wherein the interlock members are provided at the front and back with respect to the guide member, and the elastic member is provided between these interlock members in order to elastically engage the clutch member with both the rotation transmission member and the strike transmission member. The elastic member energizes both interlock members toward the opposite directions. Further, both the interlock members are mutually crossed so as to hold the operation member and an engaged member which is provided on an outer periphery of the clutch member.

Further, a third aspect of the present invention is a hammer drill including a rotation lock member in the housing which can slide in a front and back direction and engages with and disengages from the rotation transmission member which improves usability more. When the rotation lock member is engaged with the rotation transmission member, the rotation is locked and when the rotation lock member is disengaged from the rotation transmission member, the rotation is canceled. The locking and canceling of the rotation can be selected with an operation of the operation member in a state that the clutch member engages with only the strike transmission member.

Further, a fourth aspect of the present invention is a hammer drill according to the third aspect, wherein the rotation lock member is energized backward by an energizing means and a stopper piece is provided at the rotation lock member, in order to confirm the positioning of the rotation lock member in the rotation lock state. The stopper piece contacts the clutch member when the clutch member engages with the rotation transmission member.

According to the first aspect of the invention, elastic means can be provided using an existing space in a housing without using a coil spring or the like on an intermediate spindle. Thus, switching of an operation mode can be carried out smoothly with a compacted housing, which reduces the cost.

In addition to the above-described effect, according to the second aspect of the invention, when the clutch member engages with the rotation transmission member or the strike transmission member, elastically engaging can be obtained by one elastic member. Thus, the hammer drill can have a rational constitution.

Further, in addition to the above-described effects, according to the third aspect of the invention, as the hammer drill includes a rotation lock member, it can be selected a neutral state or a rotation lock state of the tool holder and the bit in a hammer mode where the clutch member engages with only the strike transmission member. Thus, more usability can be obtained.

Furthermore, in addition to the above-described effects, according to the fourth aspect of the invention, as the hammer drill includes the energizing means and the stopper piece, positioning of the rotation lock member to the rotation lock state can be accurately carried out.

BRIEF DESCRIPTION OF THE DRAWINGS

FIGS. 2A and 2B are an appearance view of an inside structure omitting a housing, in which FIG. 2A illustrates a right side face, and FIG. 2B illustrates a bottom face;

FIGS. 3A and 3B are a perspective view of an inside structure, in which FIG. 3A illustrates from the back side, and FIG. 3B illustrates the view from the front side;

FIG. 5 is appearance views of an intermediate spindle portion and an inner housing in FIG. 4, in which

FIG. 6A illustrates the view from a left and front direction and from an approximately upper direction, and FIG. 6B illustrates the same from a right and front direction and from an approximately lower direction;

FIGS. 8A to 8C are appearance views of an intermediate spindle portion and the inner housing shown in FIG. 7, in which FIG. 8A illustrates a front face, FIG. 8B illustrates a right side face, and FIG. 8C illustrates a bottom face;

FIGS. 9A and 9B are perspective views of an intermediate spindle portion and the inner housing shown in FIG. 7, in which FIG. 9A illustrates the view from a left and front direction and from an approximately upper direction and FIG. 9B illustrates the same from a right and front direction and from an approximately lower direction;

FIG. 11A illustrates a front face, FIG. 11B illustrates the right side face, and FIG. 11C illustrates a bottom face;

FIGS. 12A and 12B are perspective views of an intermediate spindle portion and the inner housing shown in FIG. 10, in which FIG. 12A illustrates the view from a left and front direction and from an approximately upper direction and FIG. 12B illustrates from a right and front direction and from an approximately lower direction;

FIG. 14A illustrates a front face, FIG. 14B illustrates the right side face, and FIG. 14C illustrates a bottom face; FIG. 15A illustrates the view from a left and front direction and from an approximately upper direction and FIG. 9B illustrates the same from a right and front direction and from an approximately lower direction.

DESCRIPTION OF THE PREFERRED EMBODIMENTS

Embodiments of the present invention will be described below with reference to the drawings.

Figure 1:
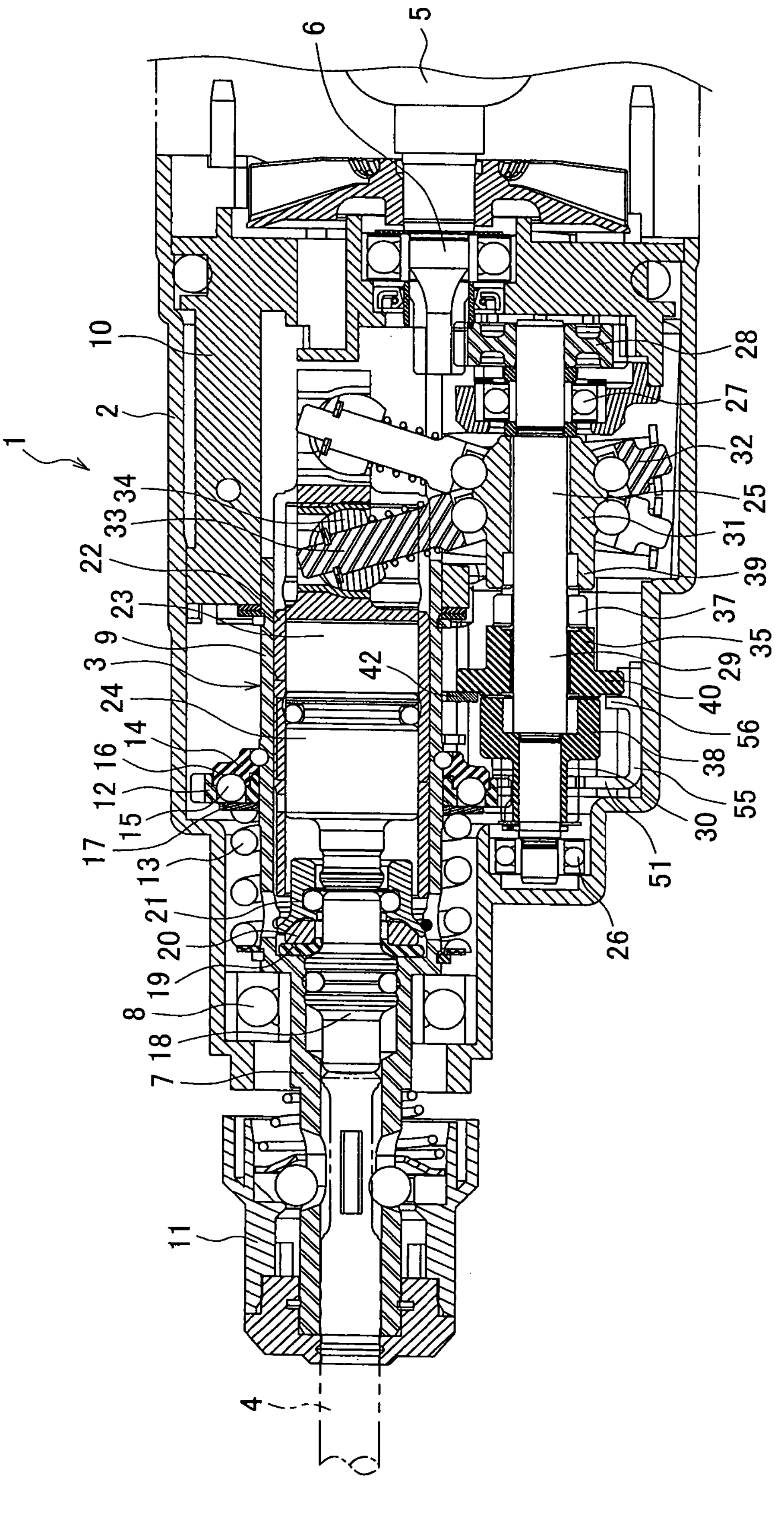
FIG. 1 is a partial longitudinal cross sectional view of a hammer drill.

FIG. 1 is a partial longitudinal cross sectional view to illustrate one example of a hammer drill. A hammer drill 1 pivotally supports a rotatable tool holder 3, which can mount a bit 4 on a front end thereof, on the front side (the left side in FIG. 1) of a housing 2, and houses a motor 5 which has a output spindle 6 directed frontward, on a back side of the housing 2.

The tool holder 3 is a cylindrical body having an intermediate part 7 and a large diameter part 9 which is provided on the back side. The intermediate part 7 is rotatably and pivotally supported by a ball bearing 8 at a front end of the housing 2, and the large diameter part 9 is rotatably and pivotally supported by an inner housing 10 assembled on the back side in the housing 2. The tool holder includes an operation sleeve 11 at a front end thereof which projects from the housing 2 to attach or detach the inserted bit 4. Further, the tool holder 3 externally includes a gear 12 on an outer periphery of the large diameter part 9. The gear 12 is energized backward by a coil spring 13 and positioned in contact with a stopper ring 14. The coil spring 13 is externally provided on the large diameter part 9 on a front side of the gear 12. The stopper ring 14 is externally fixed on the large diameter part 9 on a back side of the gear 12. A ball 15 is held at a predetermined interval in the peripheral direction and positioned into a recessed part 16 of the stopper ring 14. A washer 17 is positioned between the ball 15 and coil spring 13 and when the washer 17 pushes the ball 15, rotation of the tool holder is regulated. When load larger than energizing force of the coil spring 13 is applied to the gear 12, transmission of the rotation to the tool holder 3 is blocked by the ball 15 being advanced to ride over the recessed part 16 so as to idly rotate the gear 12, which works as a torque limiter.

Further, an impact bolt 18 is housed in the intermediate part 7 of the tool holder 3 with movability fore and aft as an intermediate element on a back side of the bit 4. On the back side of the impact bolt 18, a receiving ring 19 and a washer 20 which control a retreating position of the impact bolt 18 are housed in the large diameter part 9. Further, a grip ring 21 is housed in the large diameter part 9 as well. The grip ring 21 includes an O-ring, which can hold a front end of a striker 24 described below at the time of idly strike, on an inner periphery thereof.

Further, a strike mechanism is provided on the back side of the large diameter part 9. This strike mechanism includes a cylindrical piston cylinder 22 and a striker 24 as a strike element. The piston cylinder 22 has an opening on the front side thereof, and is inserted into the large diameter part 9 with a play. The striker 24, as a strike element, is housed in the piston cylinder 22, being movable fore and aft through an air chamber 23. When the piston cylinder 22 is reciprocated in the large diameter part 9, the striker 24 is interlocked by air spring force so as to strike a rear end of the impact bolt 18.

Figure 2A:
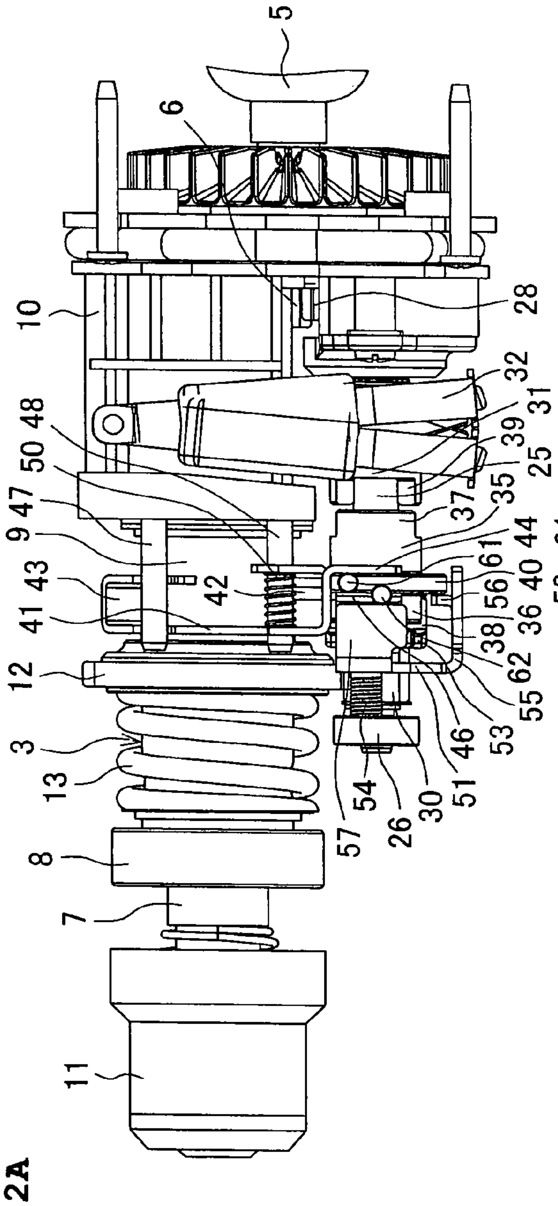
Figure 2B:
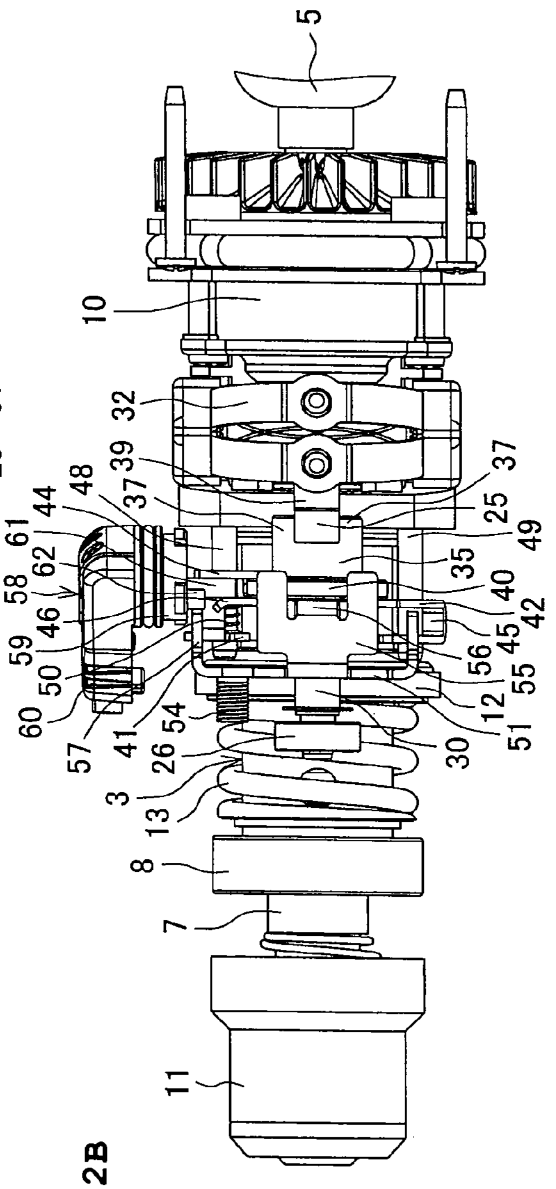
Figure 3A:
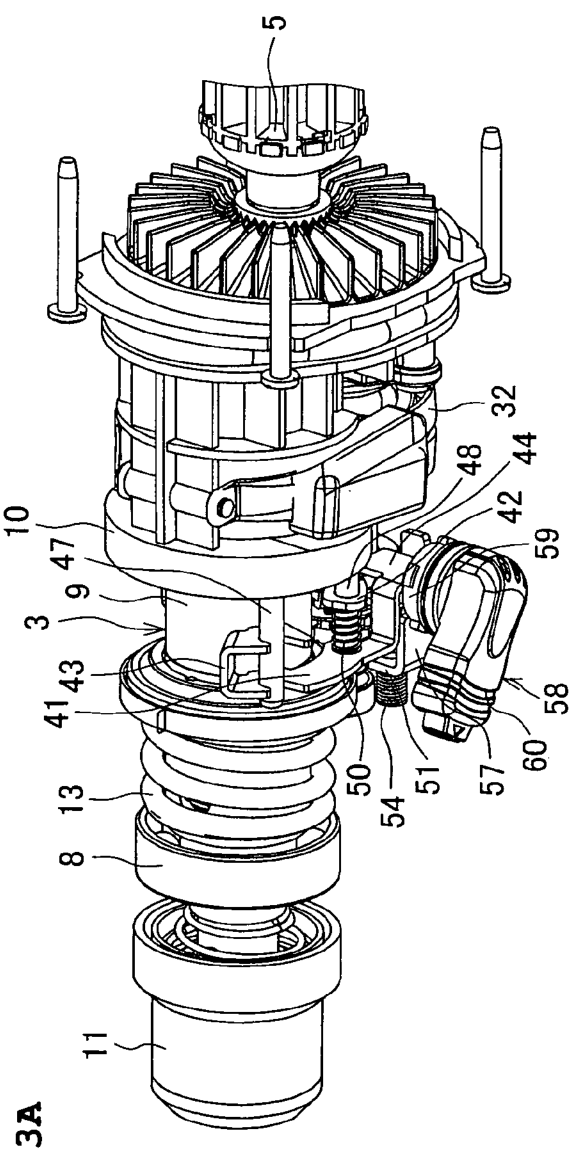
Figure 3B:
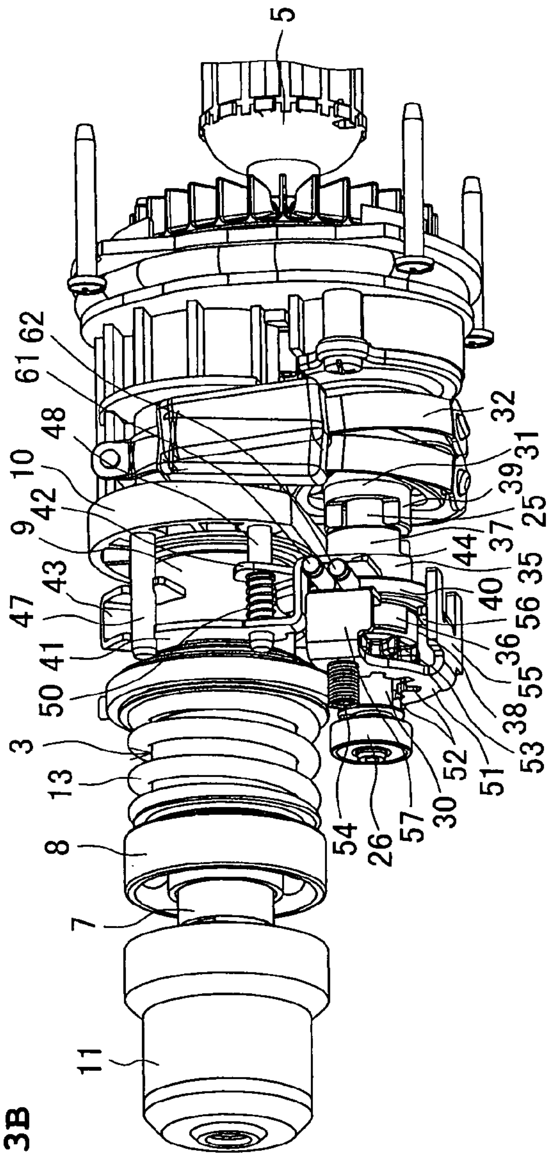

On the other hand, on a lower side of the output spindle 6 in the housing 2, an intermediate spindle 25 is pivotally supported in parallel with both the tool holder 3 and the output spindle 6 by front ball bearing 26 and back ball bearing 27. Further, the output spindle 6 is engaged with a first gear 28 provided at a rear end of the intermediate spindle 25 as illustrated in FIGS. 2 and 3. A spline tooth 29 is provided at an intermediate portion of the intermediate spindle 25 and on a front side of the spline tooth 29, a second gear 30 is externally provided as a rotation transmission member between the ball bearing 26 and the intermediate spindle 25. The second gear 30 can rotate independently from the intermediate spindle 14, and engages with the gear 12 on a side of the tool holder. Further, on a back side of the spline tooth 29, a boss sleeve 31 capable rotating independently from the intermediate spindle 25 is externally provided between the ball bearing 27 and the intermediate spindle 25 as a strike transmission member. A swash bearing 32 whose axial line is inclined is rotatably and externally fitted on an outer periphery of the boss sleeve 31. An upper end of a connecting arm 33 projecting at an upper part of the swash bearing 32 is rotatably held at a rear end of the piston cylinder 22 through a ball 34. Thus, when the boss sleeve 31 rotates, the swash bearing 32 inclines the axial line thereof frontward and backward so as to oscillate the connecting arm 33 frontward and backward, and thereby the cylinder 22 is reciprocated, as illustrated in FIGS. 1 to 3.

Further, the spline tooth 29 of the intermediate spindle 25 is spline-connected with a sleeve-shaped clutch 35 as a clutch member, and this clutch 35 can rotate integrally with the intermediate spindle 25 and can slide fore and aft. The clutch 35 has clutch pawls 36 and 36 on a front face thereof and these clutch pawls 36 and 36 can engage with engagement pawls 38 and 38 provided on a rear face of the second gear 30. On a rear face of the clutch 35, clutch pawls 37 and 37 are arranged to engage with engagement pawls 39 and 39 provided on a front face of the boss sleeve 31. The clutch 35 can engage with and disengage from one or both of the second gear 30 and boss sleeve 31 at frontward and backward sliding positions. In other words, when the clutch 35 is at an advancing position, the clutch 35 engages with the second gear 30 only so as to be integrated with the intermediate spindle 25 in a rotating direction. On the other hand, when the clutch 35 is at a retreating position, the clutch 35 engages with the boss sleeve 31 only so as to be integrated with the intermediate spindle 25 in a rotating direction. The clutch 35 engages with both the second gear 30 and the boss sleeve 31 when the clutch is at an intermediate position, so that the clutch is integrated with the intermediate spindle 25 in a rotating direction. A flange 40 is an engagement part provided at a center part on an outer periphery face of the clutch 35.

Figure 5A:
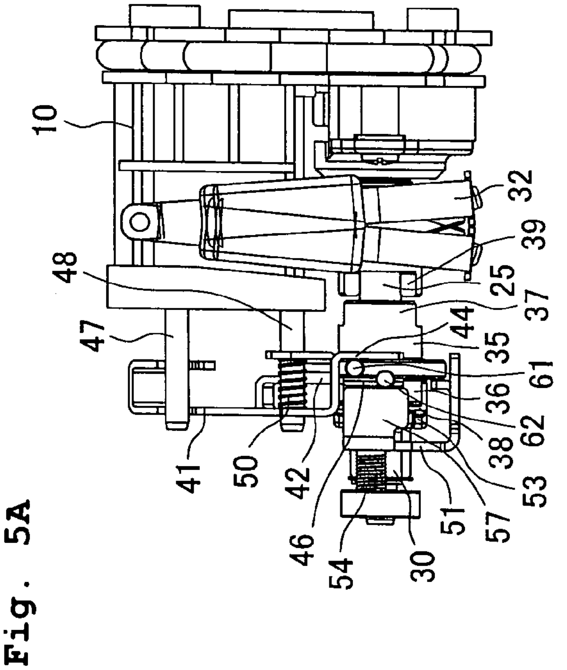
FIG. 5A illustrates a front face.
Figure 5B:
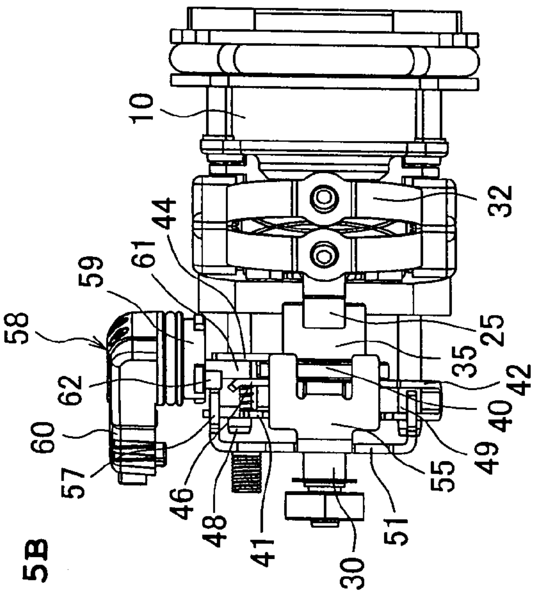
FIG. 5B illustrates a right side face.
Figure 5C:
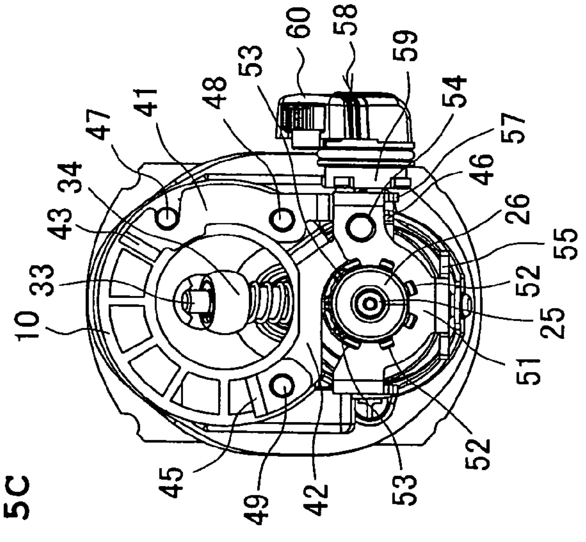
FIG. 5C illustrates a bottom face.

Further, a first interlock plate 41 and a second interlock plate 42 are provided on an upper side of the clutch 35. Both the interlock plates 41 and 42 are supported slidably fore and aft with three guide spindles 47 to 49, which work as guide members. The guide spindles 47 to 49 project frontward from a front face of the inner housing 10 and are arranged along a periphery face of the large diameter part 9 at predetermined intervals as illustrated in FIG. 5. The first interlock plate 41 is in a curved-shape being along the periphery face of the large diameter part 9 from the first guide spindle 47 to the second guide spindle 48. The first interlock plate 41 has a notch at an end edge of a C-shaped part 43 which is bent and formed at an upper end thereof, and is penetrated with the first guide spindle 4. Further, the first interlock plate 41 is penetrated with the second guide spindle 48 at an intermediate part thereof. An inverted L-shaped interlock piece 44 is positioned on the rear face side of the flange 40.

On the other hand, the second interlock plate 42 is in a curved-shape along the periphery face of the large diameter part 9 from the second guide spindle 48 to the third guide spindle 49. The second interlock plate has a C-shaped part 45 which is bent and formed at an end part thereof, on the side of the third guide spindle 49 and is penetrated by the third guide spindle 49. An end part of the interlock plate 42 on a second guide spindle 48 is penetrated with the second guide spindle 48 on a more back side than the first interlock plate 41. An interlock piece 46 is provided extending on a lower side of the end part of the second interlock plate 42. The interlock piece 46 is crossed with the interlock piece 44 of the first interlock plate 41 when seeing from the side face, and positioned on a front face side of the flange 40.

Further, in the second guide spindle 48, a coil spring 50 as an elastic member is externally provided between the first interlock plate 41 and the second interlock plate 42. By means of this coil spring 50, the first interlock plate 41 and the second interlock plate 42 are energized in the opposite directions each other, and the interlock piece 44 and the interlock piece 46 which are crossed and positioned on the front and back sides of flange 40 are energized into directions approaching each other so as to hold the flange 40.

A lock plate 51 is a rotation lock member and externally provided on a front side of the second gear 30 and can slide fore and aft. The lock plate 51 has notches 52, 52, . . . at an inner peripheral edge thereof at which the lock plate 51 are externally attached to the second gear 30. When the lock plate 51 in the retreating position, these notches 52, 52, . . . can fit to lock teeth 53, 53, . . . radially formed at a peripheral edge on the back side of the second gear 30. These notches are energized backward by a coil spring 54 provided between a front side of the lock plate 51 and an inner face of the housing 2. Further, the lock plate 51 has an extending part 55 extending backward at a lower end thereof. A stopper piece 56 formed by upward cutting and raising from the extending part 55 is positioned on a front side of the flange 40 of the clutch 35, and can contact with the flange 40 by slide of the clutch 35. Further, the lock plate 51 includes a lock piece 57 extending toward the interlock piece 44 at a side edge thereof.

Further, the housing 2 has an operation lever 58 as an operation member. The operation lever 58 includes a disc part 59 rotatably fitted to the housing 2 and a lever part 60 connected with the disc part 59 on an outer face side of the housing 2. The disc part 59 includes first and second pins 61 and 62 having different lengths and point-symmetrically projecting on an inner face on an inner face side of the housing 2. The first pin 61 which is longer projects between the interlock piece 44 of the first interlock plate 41 and the interlock piece 46 of the second interlock plate 42. The second pin 62 which is shorter projects between the interlock piece 44 and the lock piece 57 of the lock plate 51. Thus, when the first and second pins 61 and 62 change the positions fore and aft by a rotation according to a rotating operation of the lever part 60, the clutch 35 slides through the interlock pieces 44 and 46 and the lock plate 51 slides through the lock piece 57, where the interlock pieces 44 and 46 engage with the first and second pins 61 and 62.

Figure 4:
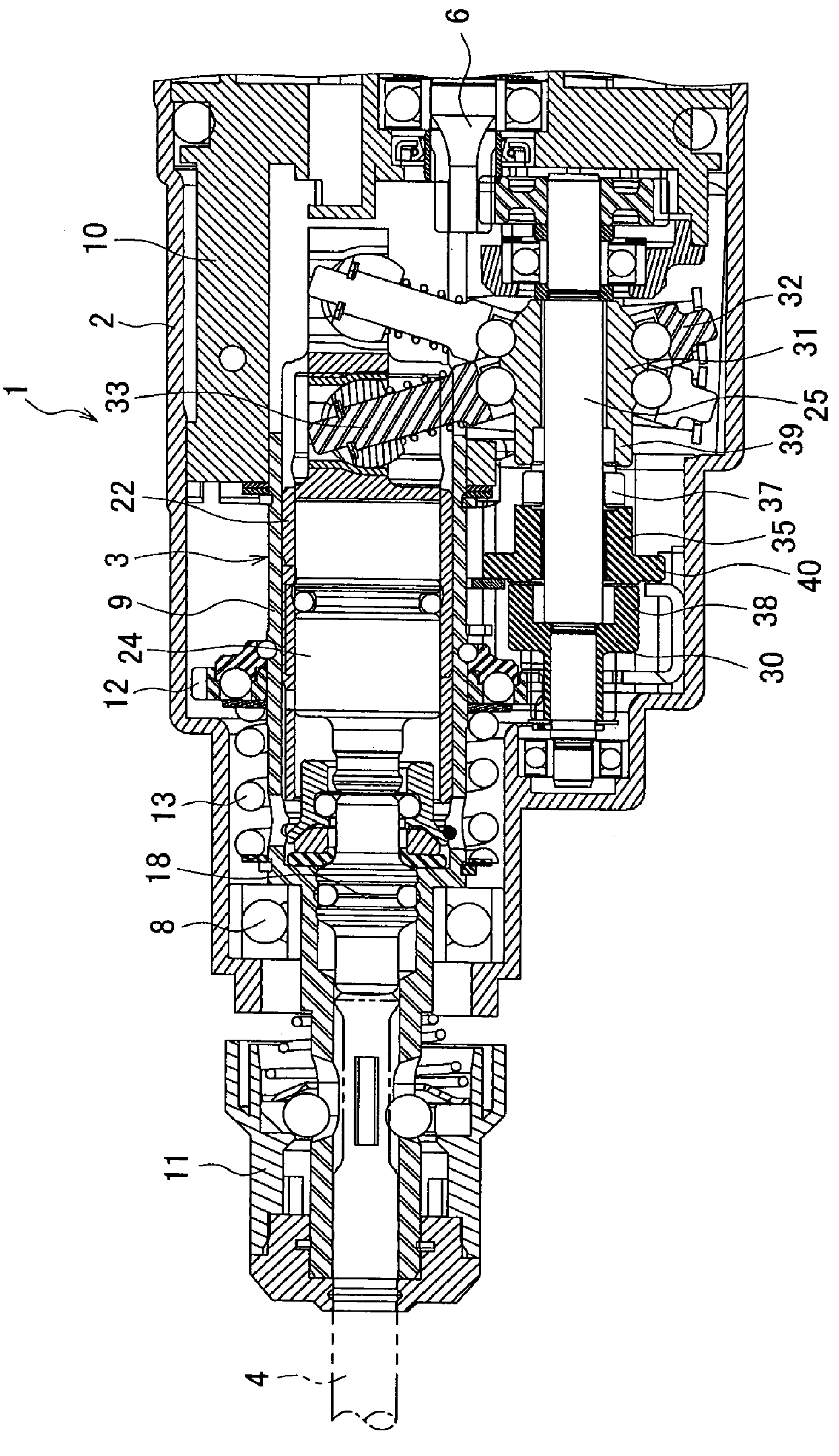
FIG. 4 is a partial longitudinal cross sectional view of a hammer drill in a drill mode.
Figure 6A:
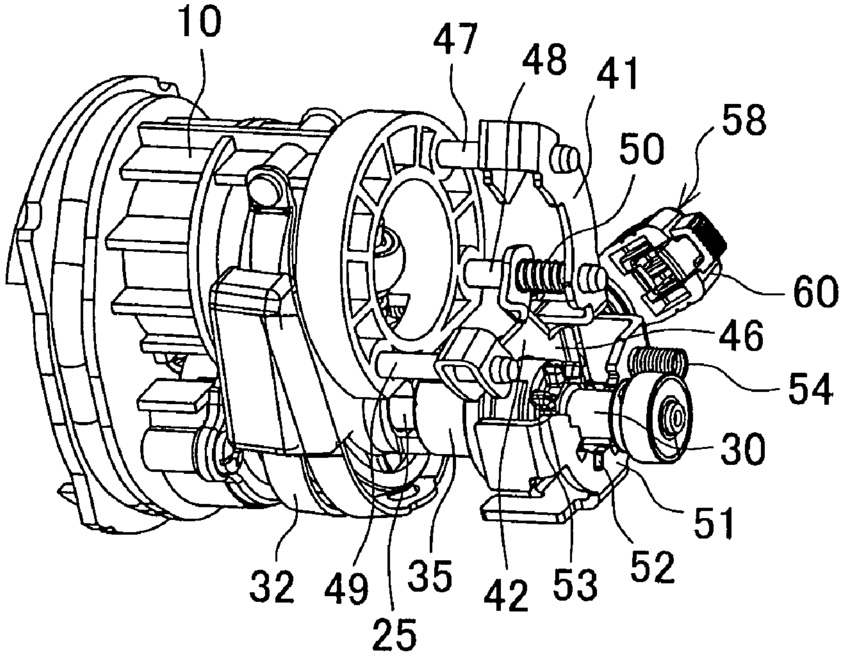
FIGS. 6A and 6B are perspective views of an intermediate spindle portion and the inner housing shown in FIG. 4.
Figure 6B:
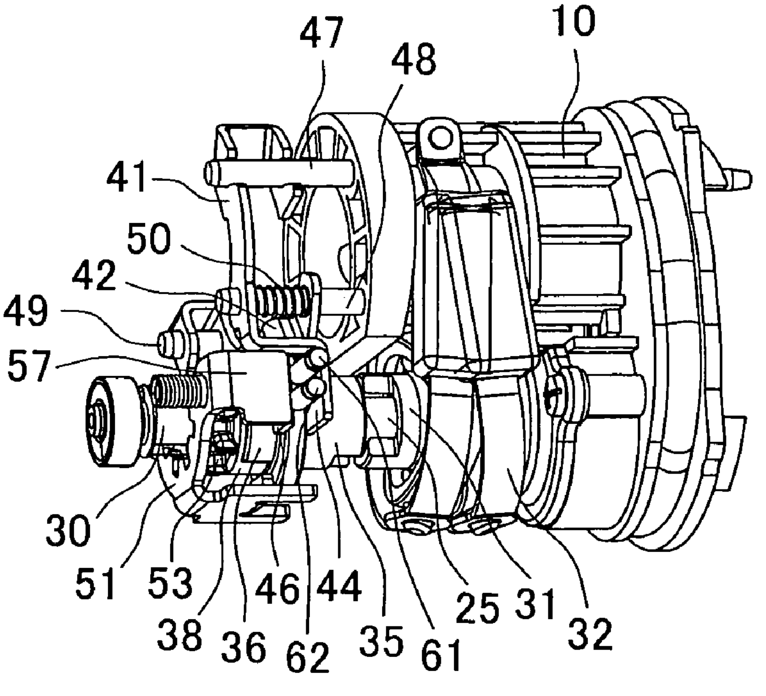

In the hammer drill 1 having the above-described constitution, when the lever part 60 is inclined frontward as illustrated in FIGS. 4 to 6, the first pin 61 is positioned closer to the foremost and the second pin 62 is positioned closer to the rearmost. Thus, the first and second interlock plates 41 and 42 slide together to advancing positions so as to slide the clutch 35 to the advancing position through the flange 40 held by the interlock pieces 44 and 46, and thereby a drill mode is made in which the clutch pawl 36 on the front face side of the clutch 35 engages with the engagement pawl 38 of the second gear 30. At this time, the lock plate 51 energized backward is stopped at a position where the lock piece 57 contacts the second pin 62 and does not engage with the lock tooth 53 of the second gear 30.

In such the switching operation, even when the phases of the clutch pawl 36 and the engagement pawl 38 are not met and these pawls are in a contact state, the first pin 61 moves closer to the front side as it is so as to compress the coil spring 50 and slide only the second interlock plate 42 to the advancing position. Therefore, frontward energizing force is applied to the clutch 35 by the coil spring 50 through the first interlock plate 41 and the clutch 35 slides to the advancing position so as to connect with the second gear 30 when the phases of the clutch pawl 36 and the engagement pawl 38 are met by the rotation of the clutch 35 rotating with the rotation of the intermediate spindle 25.

When the motor 5 is driven in the drill mode after the bit 4 is attached to the tool holder 3, the intermediate spindle 25 rotates, and this rotation is transmitted to the tool holder 3 through the clutch 35, the second gear 30, and the gear 12 so as to rotate the bit 4. On the other hand, since this rotation is not transmitted to the boss sleeve 31 as separating body from the advanced clutch 35, the piston cylinder 22 is not reciprocated. Thus, the bit 4 is only rotated.

Figure 7:
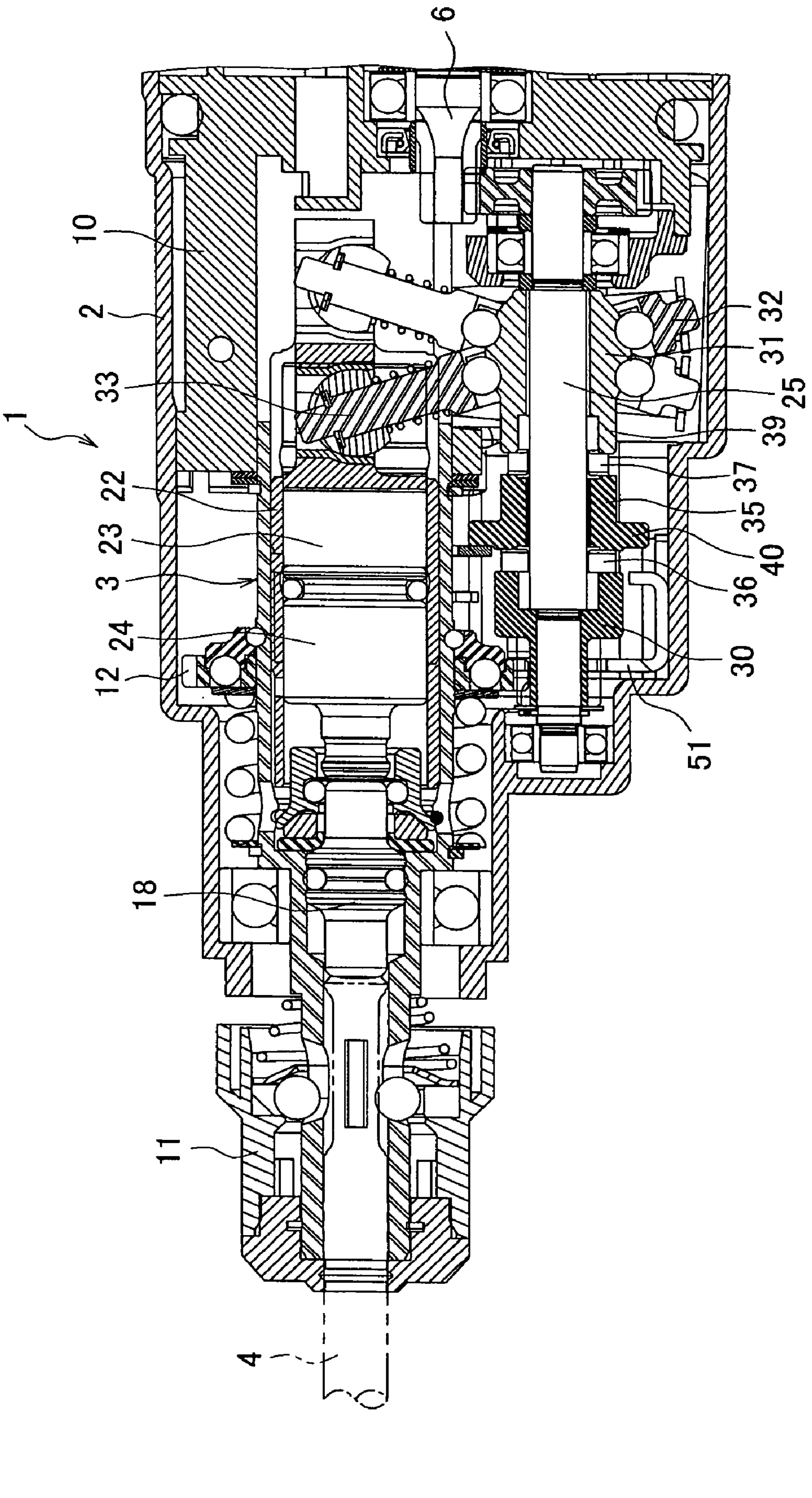
FIG. 7 is a partial longitudinal cross sectional view of a hammer drill in a hammer drill mode.
Figure 8A:
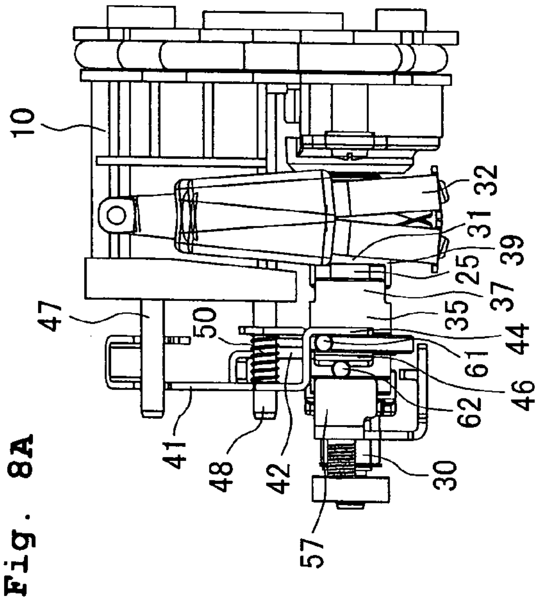
Figure 8B:
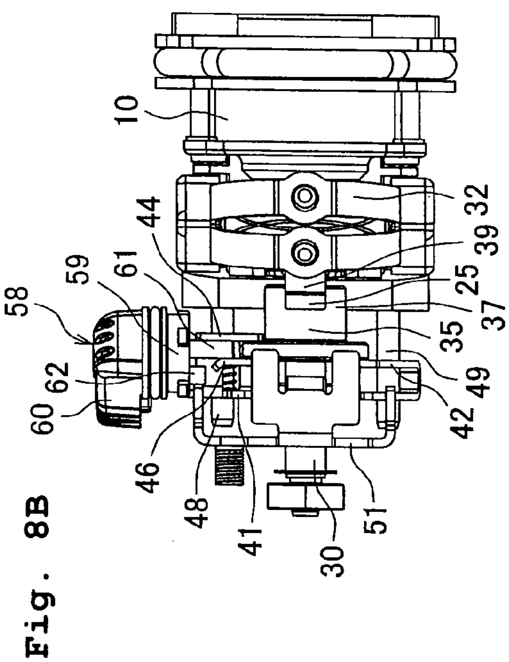
Figure 8C:
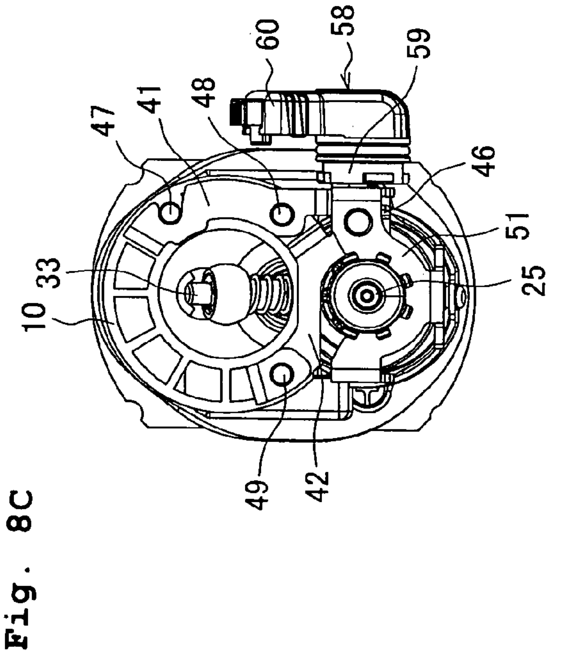
Figure 9A:
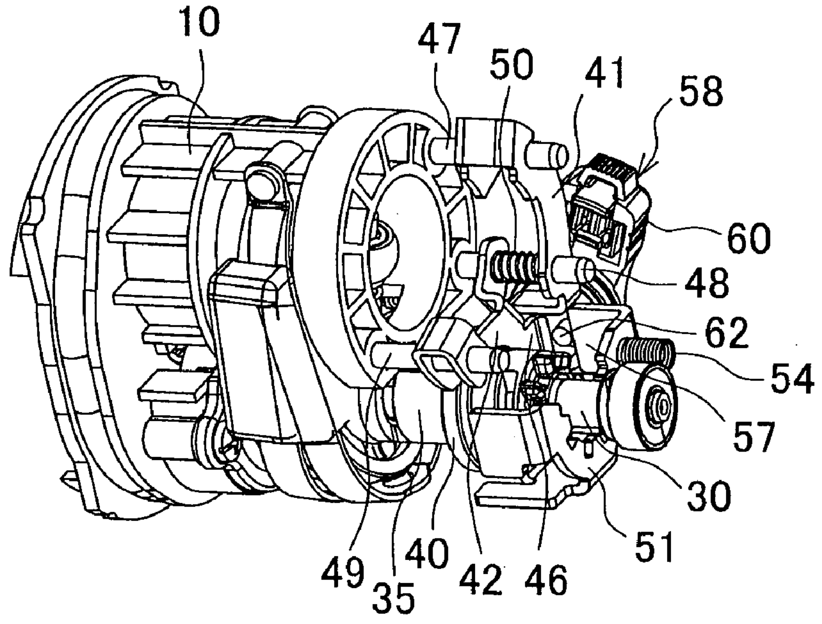
Figure 9B:
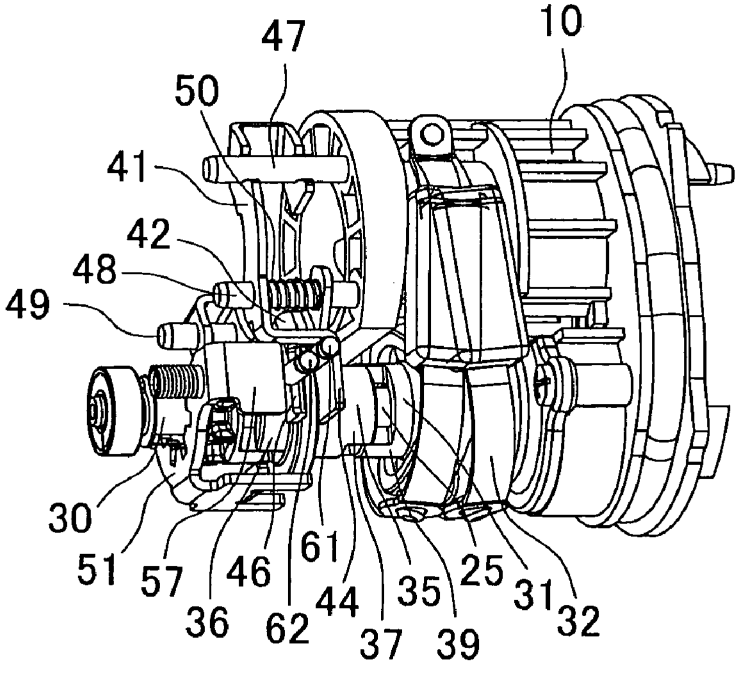

Then, as illustrated in FIGS. 7 to 9, when the operation lever 58 is turned to the right so as to make a lever part 60 to have an approximate-upwardly direction, a first pin 61 is turned to the right so as to be backward moved. Thus, the first and second interlock plates 41 and 42 slide backward so as to slide the clutch 35 to an intermediate position. Thus, a hammer drill mode can be made, in which the clutch pawl 37 on a rear face side of the clutch 35 engages with the engagement pawl 39 of the boss sleeve 31 while engaging with the second gear 30. Even when these pawls 37 and 39 are in a contacting state since the phases of these pawls are deviated at the time of engaging the clutch 35 with the boss sleeve 31, the first interlock plate 41 previously slide by the first pin 61 so as to compress the coil spring 50, and thus the clutch 35 is energized backward, like the case of engaging with the second gear 30. Thus, when the phases of the pawls meet by rotating the clutch 35, the clutch 35 retreats so as to rapidly connect with the boss sleeve 31.

When the motor 5 is driven in the hammer drill mode, the rotation of the intermediate spindle 25 is transmitted to the tool holder 3 through the clutch 35, the second gear 30, and the gear 12 so as to rotate the bit 4, and is further transmitted to the boss sleeve 31 connected with the clutch 35. Thus, the swash bearing 32 is oscillated, and the interlock arm 33 reciprocates the piston cylinder 22. By this operation, the striker 24 in the piston cylinder 22 is interlocked and reciprocates so as to strike the impact bolt 18 in which a rear end of the bit 4 contacts. Thus, rotation and striking are transmitted to the bit 4.

Figure 10:
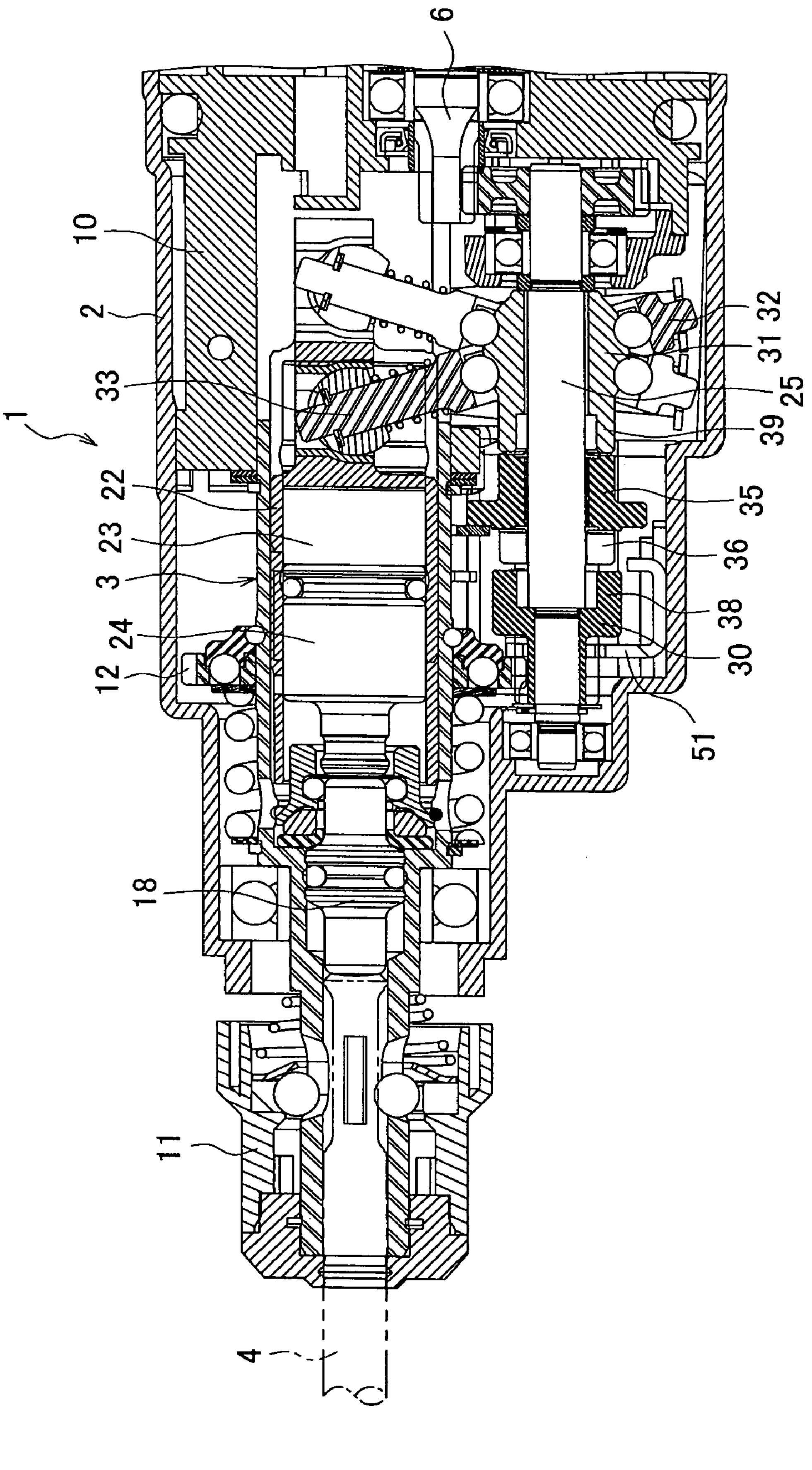
FIG. 10 is a partial longitudinal cross sectional view of a hammer drill in a hammer mode (a neutral state)
Figure 11A:
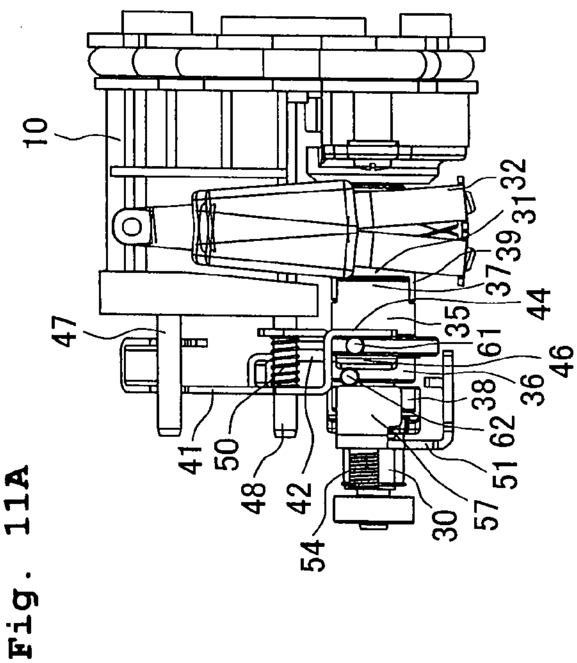
FIGS. 11A to 11C are appearance views of an intermediate spindle portion and the inner housing shown in FIG. 10.
Figure 11B:
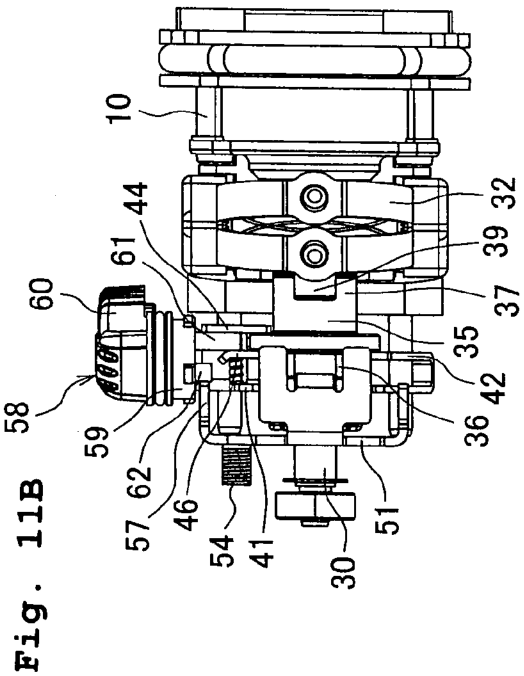
Figure 11C:
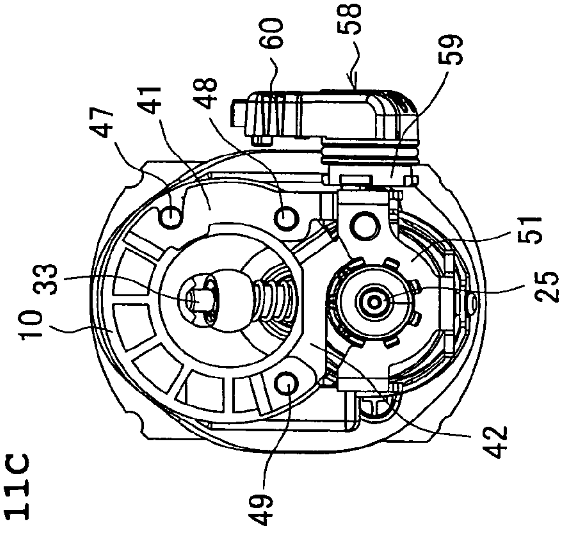
Figure 12A:
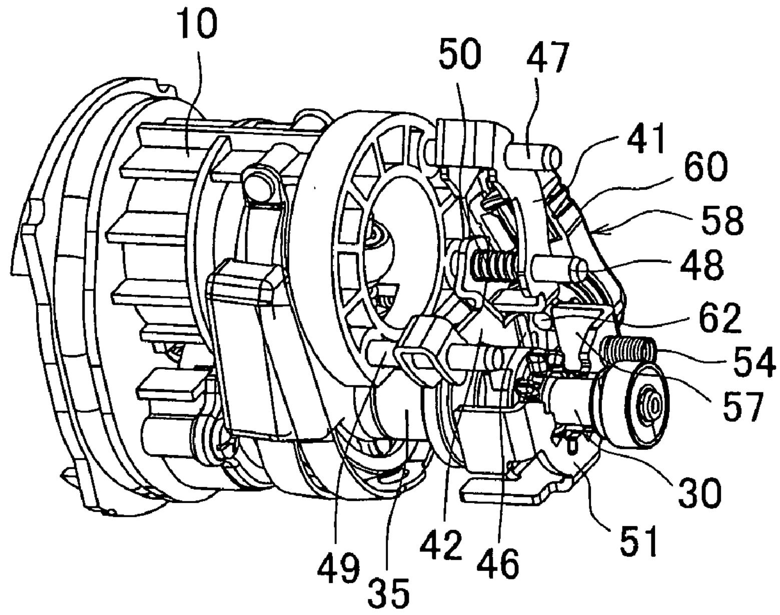
Figure 12B:
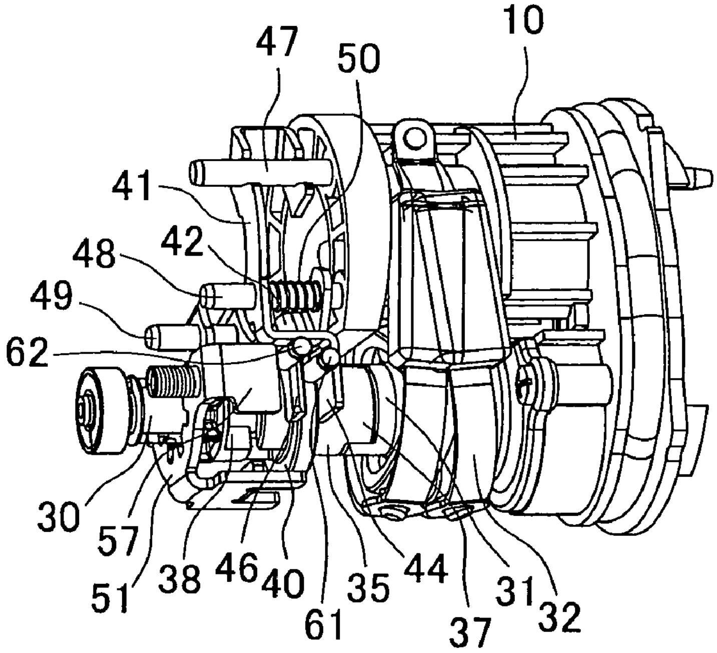

Then, as illustrated in FIGS. 10 to 12, when an operation lever 58 is turned to the right so as to incline the lever part 60 backward, the first pin 61 is further turned to the right and backward moved. Thus, a hammer mode can be made, in which the clutch 35 slides to a retreating position together with the first and second interlock plates 41 and 42 so as to separate from the second gear 30. At this time, although the second pin 61 is turned to the right as well, the backward moving distance is small. Thus, the lock plate 51 slides backward, but the second pin 61 does not fit to the lock tooth 53 of the second gear 30.

When the motor 5 is driven in this hammer mode, the rotation of the intermediate spindle 25 is not transmitted to the second gear 30, and the tool holder 3 is not rotated. However, the boss sleeve 31 rotates so as to reciprocate the piston cylinder 22, and thus only striking is transmitted to the bit 4. At this time, since the rotation of second gear 30 is not locked, the rotation of the tool holder 3 becomes free. Therefore, a neutral state is made, in which an angle around an axial line of the bit 4 can be arbitrarily changed.

Figure 13:
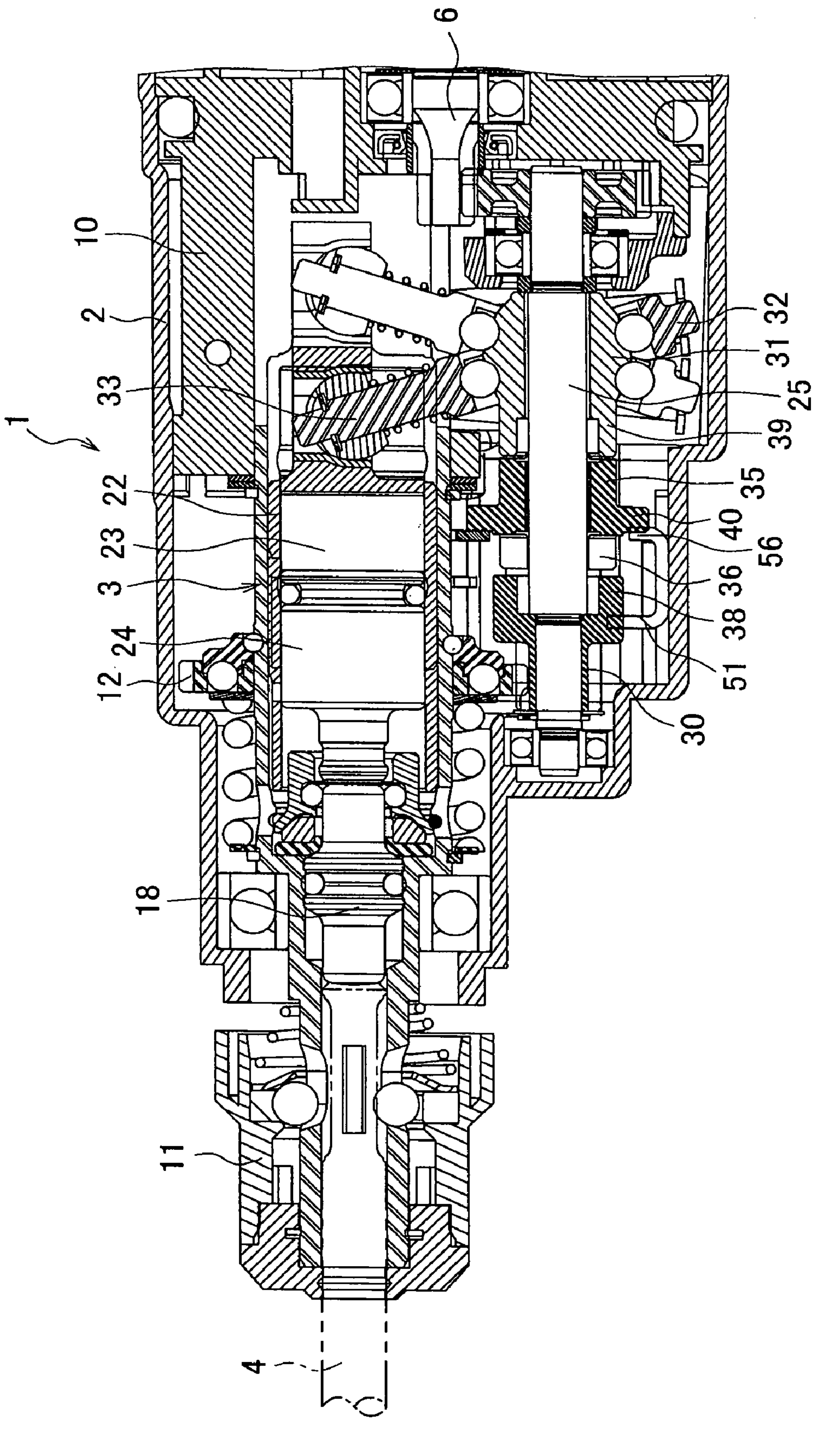
FIG. 13 is a partial longitudinal cross sectional view of a hammer drill in a hammer mode (a rotation lock state)
Figure 14A:
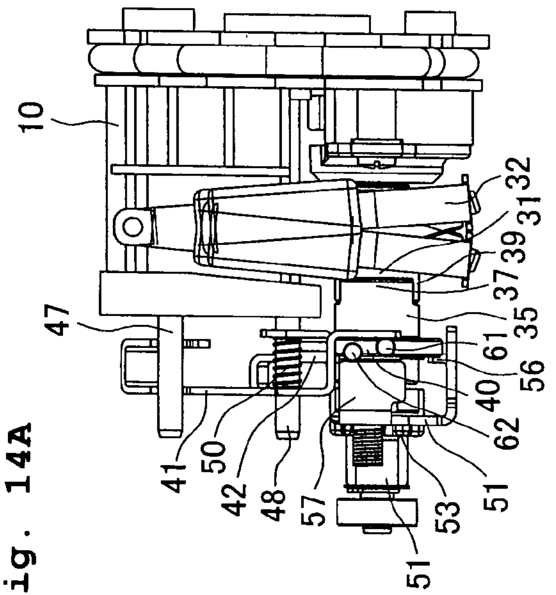
FIGS. 14A to 14C are appearance views of an intermediate spindle portion and the inner housing shown in FIG. 13.
Figure 14B:
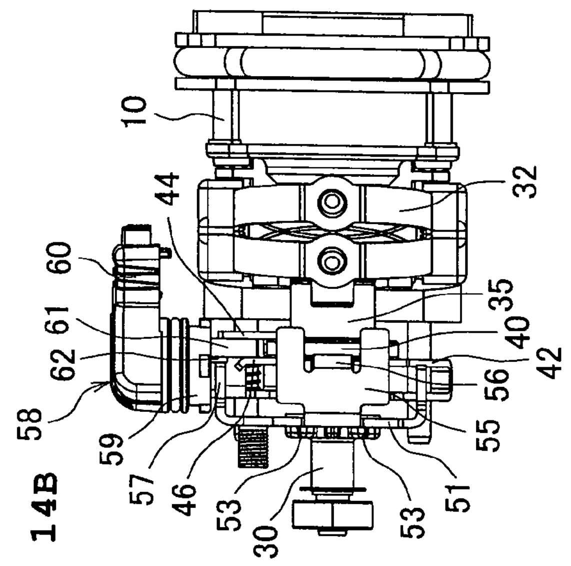
Figure 14C:
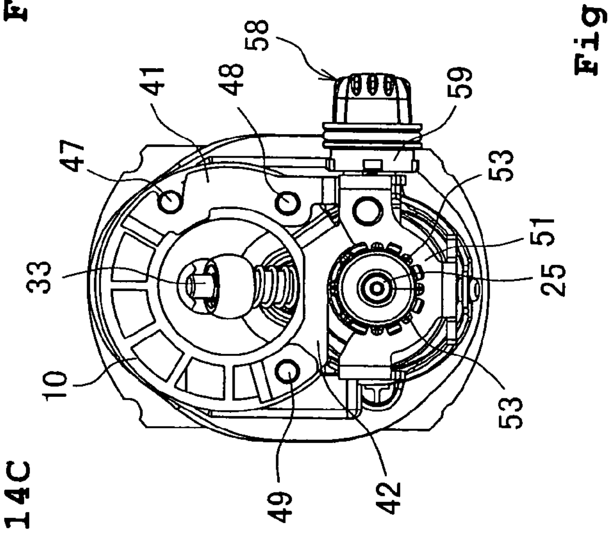
Figure 15A:
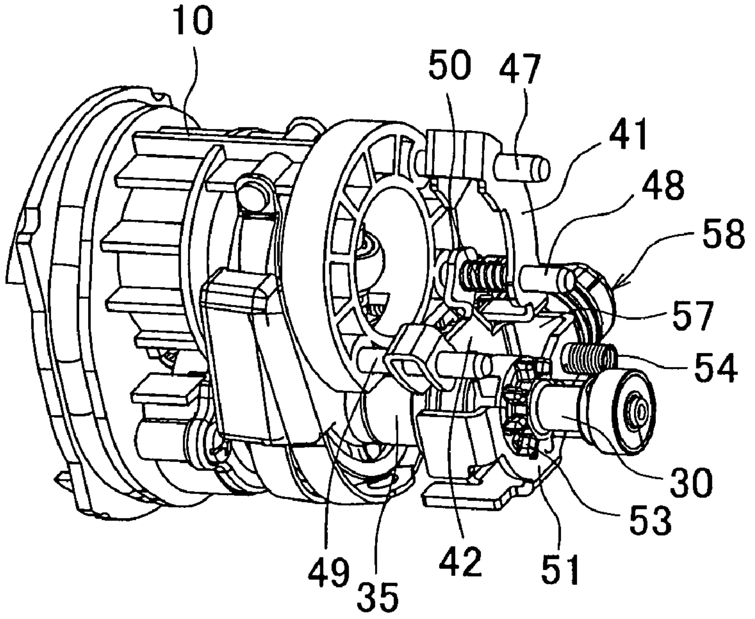
FIGS. 15A and 15B are perspective views of an intermediate spindle portion and the inner housing shown in FIG. 13.
Figure 15B:
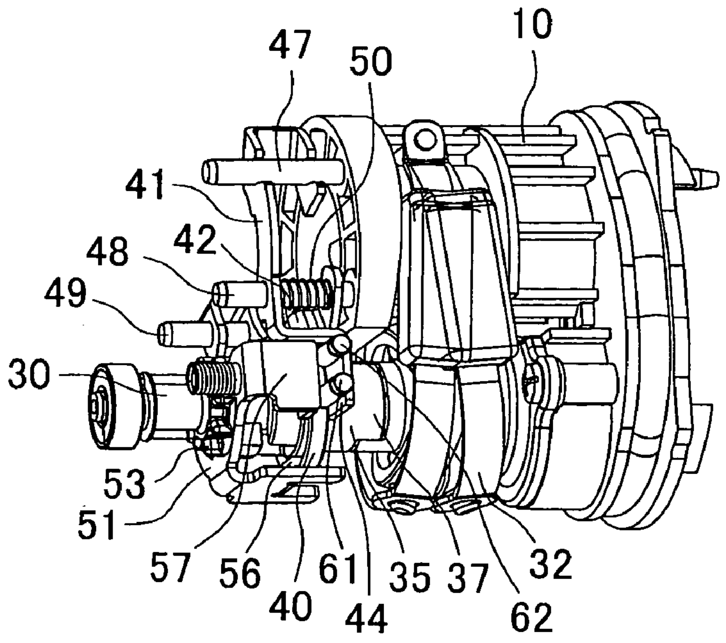

Then, as illustrated in FIGS. 13 to 15, when the operation lever 58 is further turned to the right so as to incline the lever part 60 backward, the first pin 61 is hardly moved on a back side even when the first pin 61 turns to the right. Thus, the positions of the first interlock plates 41, the second interlock plates 42, and the clutch 35 are not changed, and the hammer mode is kept. However, since the second pin 62 is moved to the rearmost, the lock plate 51 further slides backward until the stopper piece 56 contacts the flange 40 of the clutch 34. Then, the stopper piece 56 engages with the lock tooth 53 so as to lock the rotation of the second gear 30.

Therefore, when the motor 5 is driven, only the strike mechanism is operated so as to transmit only strike to the bit 4. At that time, an operation mode becomes a rotation lock state in which the tool holder 3 is locked to rotate and an angle of the bit 4 is fixed.

In this manner, according to the hammer drill 1 of the above-described embodiment, the elastic means for elastically engaging the clutch 35 can be provided using an existing space in the housing 2 without using a coil spring or the like on the intermediate spindle 25. In other words, the elastic means includes the first to third guide spindles 47 to 49 provided in parallel with the intermediate spindle 25, the first and second interlock plates 41 and 42 which are provided at the first to third guide spindles 47 to 49 and integrally slidable while engaging with the clutch 35, and the coil spring 50 for energizing the first and second interlock plates 41 and 42 along the first to third guide spindles 47 to 49. Thus, the housing 2 can be compacted and the cost can decrease while keeping smooth switching of an operation mode.

More particularly, in this embodiment, the first and the second interlock plates 41 and 42 are provided fore and aft, and the coil spring 50 is provided between these interlock plates so as to energize the first and second interlock plates 41 and 42 to the opposite directions. Further, the first and second interlock plates 41 and 42 are crossed each other so as to hold the flange 40 provided on the outer periphery of the clutch 35 and the first pin 61 of the operation lever 58. Thus, when the clutch 35 engages with any one of the second gear 30 and the boss sleeve 31 by using the one coil spring 50, the clutch 35 can elastically engage so as to make a rational constitution.

Further, the lock plate 51 slidable fore and aft is provided in the housing 2. When the lock plate 51 is engaged with the second gear 30, the rotation is locked, and when the lock plate 51 is disengaged from the second gear 30, the rotation is canceled. The locking and canceling of the rotation can be selected with an operation of the operation lever 58 in a state that the clutch 35 is engaged with only the boss sleeve 31. Thus, a neutral state and a rotation lock state of the tool holder 3 and the bit 4 can be selected in a hammer mode. Thus, handling property is preferable.

Further, the lock plate 51 is energized backward by the coil spring 54. The stopper piece 56 contacting the flange 40 of the clutch 35 while engaging with the second gear 30 is provided at the lock plate 51. Thus, positioning of the lock plate 51 to the rotation lock state can be accurately carried out.

In addition, the number of the guide members is not limited to that in the above-described embodiment. For example, the number of guide spindles can be decreased by omitting the third guide spindle and using only the first and second spindles to guide sliding of both interlock plates. Further, the position at which a guide member is provided is not limited to an outer side of a tool holder, and can be properly changed if a dead space in the housing can be used. Of course, the guide member can project from frontward to backward, and a plate body can be used instead of a spindle body.

Further, the embodiment of an interlock member is not limited to the above-described interlock plate, and a design of the member can be properly changed by, for example, providing a cylindrical body loosely inserting a guide spindle so as to be slidable.

In addition, when an interlock member engages with a clutch, a groove recessed on a peripheral face of a clutch can be used instead of a flange in the above-described embodiment. An elastic member is not limited to a coil spring, and can be other members such as a plate spring and a disc spring.

On the other hand, in the above-described embodiment, a rotation lock member is provided so as to select the neutral state and the rotation lock state in the hammer mode. However, the hammer mode can be only the neutral state by removing the rotation lock member.

Furthermore, an interlock member is not limited to interlock members provided fore and aft. Depending on a structure of engaging a clutch member with an opposite member, one interlock member can be slidably provided with a guide member so as to interlock with the clutch member and the interlock member can be energized toward any one of front and back directions by an elastic member such as a coil spring.

What is claimed is:

1. A hammer drill comprising:

a housing;

a tool holder rotatably and pivotally supported on the front side in the housing and capable of mounting a bit on a front end thereof;

a strike mechanism provided on the back side of the tool holder in the housing to strike the bit;

a motor arranged on a back side in the housing;

an intermediate spindle pivotally supported in parallel with the tool holder in the housing and being transmitted rotation from an output spindle of the motor;

a rotation transmission member rotatably provided on a front side on the intermediate spindle as a separated body from the intermediate spindle and transmitting the rotation of the intermediate spindle toward the tool holder side by rotating;

a strike transmission member rotatably provided on the back side on the intermediate spindle as a separated body from the intermediate spindle, converting the rotation of the intermediate spindle to a front and back movement by rotating, and transmitting the movement to the strike mechanism;

a clutch member provided between the rotation transmission member and the strike transmission member, being integrally rotatable with the intermediate spindle, and slidable fore and aft;

an operation member to slide the clutch member so as to engage with and disengage from at least one of the rotation transmission member and the strike transmission member by operating from an external of the housing;

elastic means to elastically engage the clutch member with the rotation transmission member and/or the strike transmission member when the clutch member is slid; and wherein the elastic means comprises a guide member being provided in parallel with the intermediate spindle, at least one interlock member being provided on the guide member and integrally slidable by engaging with the clutch member, and an elastic member energizing the interlock member along the guide member.

2. The hammer drill according to claim 1, wherein the at least one interlock member comprises a plurality of interlock members, the plurality of interlock members are provided at the front and back with respect to the guide member, and the elastic member is provided between the plurality of interlock members so as to energize both members toward the opposite directions each other, while both the plurality of interlock members are mutually crossed so as to hold the operation member and an engaged member which is provided on an outer periphery of the clutch member.

3. The hammer drill according to claim 2, wherein the plurality of interlock members are a first interlock plate and a second interlock plate which are penetrated with a guide spindle and slidably supported, and wherein the engaged member is a flange held by the first interlock plate and the second interlock plate provided on an outer periphery of a clutch.

4. The hammer drill according to claim 3, wherein the elastic member is a coil spring externally mounted with the guide spindle between the first interlock plate and the second interlock plate.

5. The hammer drill according to claim 3, wherein the operation member comprises an operation lever being rotatably provided to the housing, which includes a first pin being held between the first interlock plate and the second interlock plate and is projecting at an eccentric position, and wherein sliding positions of the first interlock plate and the second interlock plate are changed by circular movement of the first pin with an operation by the operation lever.

6. The hammer drill according to claim 5, wherein a second pin which is shorter than the first pin is provided at the eccentric position of the operation lever, and the backward energized rotation lock member contacts, and wherein the sliding position of the rotation lock member is changed by circular movement of the second pin with the rotation by the operation lever.

7. The hammer drill according to claim 2, further comprising:

a rotation lock member in the housing, wherein the rotation lock member is slidable fore and aft, and switchable between locking of the rotation by engaging with the rotation transmission member and canceling of the lock by disengaging from the rotation transmission member according to an operation with the operation member in a state where the clutch member is engaged with only the strike transmission member.

8. The hammer drill according to claim 7, wherein the rotation lock member is energized backward by an energizing means, while the rotation lock member comprises a stopper piece contacting to the clutch member in a state where the rotation lock member is engaged with the rotation transmission member.

9. The hammer drill according to claim 1, wherein the guide member includes a plurality of guide spindles projecting in parallel with the tool holder in the housing.

10. The hammer drill according to claim 1, further comprising:

a rotation lock member in the housing, wherein the rotation lock member is slidable fore and aft, and switchable between locking of the rotation by engaging with the rotation transmission member and canceling of the lock by disengaging from the rotation transmission member according to an operation with the operation member in a state where the clutch member is engaged with only the strike transmission member.

11. The hammer drill according to claim 10, wherein the rotation lock member is energized backward by an energizing means, while the rotation lock member comprises a stopper piece contacting to the clutch member in a state where the rotation lock member is engaged with the rotation transmission member.

12. The hammer drill according to claim 1, wherein a first gear engaging with the output spindle of the motor is provided at a rear end of the intermediate spindle, and wherein a second gear engaging with a gear provided at the tool holder is used as the rotation transmission member.

13. The hammer drill according to claim 12, wherein:

a rotatable gear is provided at the tool holder; and energized to a position by the coil spring, where the rotation is regulated by being engaged with an outer periphery of the tool holder, wherein when load more than an energizing force of the coil spring is applied to the gear, the gear is idly rotated and the transmission of rotation from the second gear to the tool holder, which works is shut off as a torque limiter.

14. The hammer drill according to claim 1, wherein the strike mechanism includes a piston cylinder being inserted into the tool holder from backside and the piston cylinder houses a strike element of a bit movably fore and aft through an air chamber, and wherein the piston cylinder is reciprocated by rotation of the strike transmission member so as to move the strike element fore and aft.

15. The hammer drill according to claim 14, wherein an intermediate element is further provided on the front side of the strike element in the tool holder contacting with a rear end of the bit.

16. The hammer drill according to claim 14, wherein the strike transmission member comprises a boss sleeve being externally provided rotatably as a separating body from the intermediate spindle, and a swash bearing externally fitted to an outer periphery of the boss sleeve while inclining an axial line thereof, and an interlock arm projecting at the swash bearing connects with the piston cylinder.

17. The hammer drill according to claim 1, wherein the clutch member is a sleeve being spline-connected with the intermediate spindle and having pawls at front and rear faces.

* * * * *